E. B. CANTRELL & G. E. MILLER.
SHIM.
APPLICATION FILED MAY 7, 1918.

1,297,658.

Patented Mar. 18, 1919.

Inventors:-
Edwin B. Cantrell
George E. Miller
By
Strong & Townsend
Attorneys

UNITED STATES PATENT OFFICE.

EDWIN B. CANTRELL AND GEORGE E. MILLER, OF SAN FRANCISCO, CALIFORNIA.

SHIM.

1,297,658.　　　　　　Specification of Letters Patent.　　Patented Mar. 18, 1919.

Application filed May 7, 1918. Serial No. 233,144.

*To all whom it may concern:*

Be it known that we, EDWIN B. CANTRELL and GEORGE E. MILLER, citizens of the United States, residing at the city and county of San Francisco and State of California, have invented new and useful Improvements in Shims, of which the following is a specification.

This invention relates to a shim, and particularly to a shim which is adapted to be inserted between the hub of a wheel and the axle where the wheel is rigidly secured on the axle, the object of the invention being to provide a cone-shaped split shim adapted to be placed on the tapered end of a driving axle and to provide said shim with means for securing it against endwise movement when the wheel is applied. Further objects will hereinafter appear.

The invention consists of the parts and the combination, construction and arrangement of parts as hereinafter more fully described and claimed, having reference to the accompanying drawings, in which—

Figure 1:
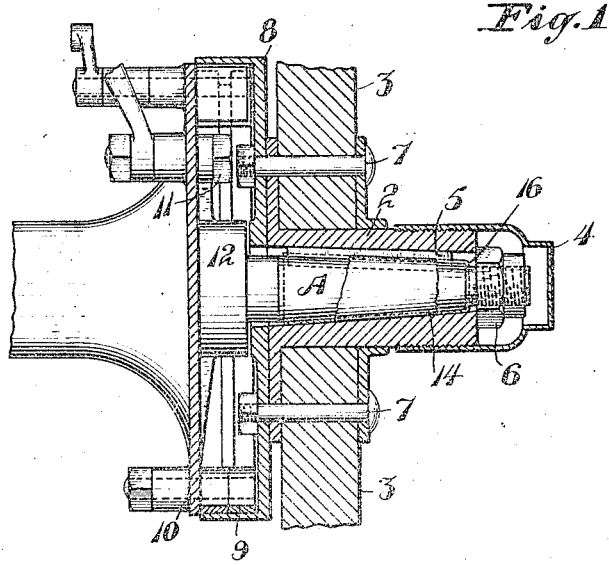
Figure 1 is a side elevation in section of a driving axle, wheel hub and brake drum showing the application of the invention.

Referring to the drawings in detail, A indicates the tapered end of a driving axle, 2 the hub of a wheel, 3 the spokes secured therein, 4 the hub cap, 5 the hub key and 6 the castle nut by which the hub is secured when placed on the axle. Secured to the inner side of the wheel hub by means of bolts 7 is a brake drum 8, and mounted interior of the brake drum is a hub brake shoe 9 which is carried by the end flange 10 of the axle housing. Projecting into the brake drum 8 from the face of the end flange of the axle housing are several nuts, such as shown at 11. One of these nuts secures the radius rod bolt, another one the hub brake, cam shaft lever, etc., and also projecting from the face of the flange 10 is the axle housing cap 12.

In actual practice, when it is desired to place the wheel proper on the axle it is only necessary to slip it over the tapered end A on the axle, then to insert the key 5 and finally to draw the wheel tight upon the shaft by turning or tightening up the castle nut 6. Constant removal and replacing of the wheel causes more or less wear on the tapered end of the shaft and also more or less expansion of the wheel hub. It can therefore be seen that the wheel has a tendency to be crowded inwardly more and more as wear takes place. This finally produces more or less disastrous results, as the nuts on the inner ends of the hub bolts 7 will begin to strike the nuts 11 carrying the radius rods, etc., and it also permits the inner face of the brake drum to crowd up against the axle housing cap, thus producing unnecessary friction and damage to the several nuts described. In fact, it often happens that the wheel locks itself entirely and it becomes necessary to cut away the nuts to permit the wheel to turn.

Figure 2:
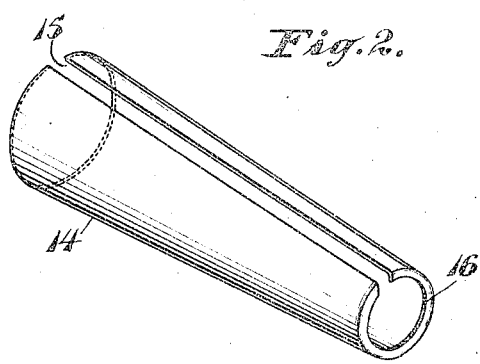
Fig. 2 is a perspective view of the shim proper.

These defects are overcome in the present instance by providing a cone-shaped shim, such as shown at 14, in Fig. 2. This shim is split longitudinally, as at 15, and is provided with an annular flange 16 at one end to lock it against endwise movement. This shim when placed upon the tapered end of the axle takes up any wear or expansion that may have taken place and therefore always retains the wheel in its proper place upon the axle. It furthermore becomes possible to tighten up the nut 6 as much as desired, as there is no danger of crowding the wheel and the brake drum carried thereby endwise, either against the axle housing cap 12 or the other parts previously referred to. The split 15 formed in the shim permits the insertion of the key 5 and the end flange 16 prevents endwise movement on the shim when the wheel hub is being tightened up by the castle nut. This flange may be formed at either end of the shim and may be turned inwardly, as shown, or outwardly, this feature depending entirely upon its application.

Where excess wear has taken place it is obvious that two or even more shims may be placed one exterior of the other. We similarly wish it understood that the materials and finish of the several parts may be such as the experience and manufacturer may dictate.

Having thus described our invention, what we desire to claim and secure by Letters Patent is:

1. A cone-shaped split shim and an inwardly turned annular flange on one end of the shim.

2. The combination with an axle having a tapered end, a keyway formed in said end and a wheel hub adapted to be received on said axle and secured against turning thereon by the insertion of a key, of a shim adapted to be interposed between the tapered axle and the wheel hub, said shim being split to permit insertion of the key and a flange on the shim adapted to secure it against endwise movement on the tapered axle when the hub is driven into place.

In testimony whereof we have hereunto set our hands in the presence of two subscribing witnesses.

EDWIN B. CANTRELL.
GEORGE E. MILLER.

Witnesses:
JOHN H. HERRING,
W. W. HEALEY.